(12) United States Patent
Guinart

(10) Patent No.: US 8,576,121 B2
(45) Date of Patent: Nov. 5, 2013

(54) METHOD FOR LATERAL LOCALIZATION OF THE WHEELS OF A VEHICLE

(75) Inventor: Nicolas Guinart, Toulouse (FR)

(73) Assignee: Continental Automotive France, Toulouse (FR)

( * ) Notice: Subject to any disclaimer, the term of this patent is extended or adjusted under 35 U.S.C. 154(b) by 105 days.

(21) Appl. No.: 13/383,689

(22) PCT Filed: Jul. 8, 2010

(86) PCT No.: PCT/EP2010/004179
§ 371 (c)(1),
(2), (4) Date: Jan. 12, 2012

(87) PCT Pub. No.: WO2011/006619
PCT Pub. Date: Jan. 20, 2011

(65) Prior Publication Data
US 2012/0116607 A1    May 10, 2012

(30) Foreign Application Priority Data
Jul. 15, 2009  (FR) ..................................... 09 03458

(51) Int. Cl.
*G08B 13/14* (2006.01)
(52) U.S. Cl.
USPC .......... 342/442; 701/36; 702/150; 340/572.1; 342/417
(58) Field of Classification Search
USPC ......... 342/417; 340/447, 572.1, 442; 702/150
See application file for complete search history.

(56) References Cited

U.S. PATENT DOCUMENTS

| 6,112,587 | A * | 9/2000 | Oldenettel | 73/146.5 |
| 6,204,758 | B1 | 3/2001 | Wacker | |
| 7,423,532 | B2 * | 9/2008 | Stewart et al. | 340/572.1 |
| 7,693,626 | B2 * | 4/2010 | Breed et al. | 701/34.4 |
| 7,768,383 | B2 * | 8/2010 | Fink et al. | 340/447 |
| 8,095,333 | B2 * | 1/2012 | Penot et al. | 702/145 |
| 8,217,776 | B2 * | 7/2012 | Hyde | 340/442 |
| 2006/0044125 | A1 * | 3/2006 | Pierbon | 340/442 |
| 2008/0129478 | A1 * | 6/2008 | Fink et al. | 340/447 |
| 2009/0144017 | A1 * | 6/2009 | Penot et al. | 702/150 |

FOREIGN PATENT DOCUMENTS

| EP | 0760299 B1 * | 3/1999 |
| FR | 2847667 | 5/2004 |

OTHER PUBLICATIONS

International search report dated Jun. 15, 2011 in corresponding PCT/EP2010/004179.

* cited by examiner

*Primary Examiner* — Mary Cheung
*Assistant Examiner* — Michael Berns
(74) *Attorney, Agent, or Firm* — Young & Thompson

(57) ABSTRACT

Method for localization of the lateral position of the wheels of a vehicle equipped with a tire pressure monitoring system. Each wheel of the vehicle includes an electronic unit fixed onto a rim of radius R. Each unit notably includes two accelerometers, disposed perpendicular to one another and one measuring a radial component $F_1$ of the acceleration, and the other a tangential component $F_2$ of the acceleration. These components are out of phase by a predetermined phase-shift angle $\alpha$. The method includes:
I) measuring, per wheel rotation, at given intervals of time ($T_{measurement}$), a number (N) of acceleration values by each of the accelerometers (5a, 5b),
II) calculating a physical value (P) representative of the sign of the phase-shift angle $\alpha$ between the two accelerometers,
III) determining the lateral position of the wheel, based on the physical value (P) representative of the sign of the phase-shift angle.

9 Claims, 2 Drawing Sheets

METHOD FOR LATERAL LOCALIZATION OF THE WHEELS OF A VEHICLE

FIELD OF THE INVENTION

The invention relates to a method for lateral localization of the wheels of a vehicle equipped with a tire pressure monitoring system.

BACKGROUND OF THE INVENTION

For safety reasons, automobile vehicles are increasingly being fitted with tire pressure monitoring systems comprising sensors, mounted on each of the wheels of the vehicle, dedicated to the measurement of parameters, such as pressure and/or temperature of the tires equipping these wheels and designed to inform the driver of any abnormal variation of the measured parameter.

SUMMARY OF THE INVENTION

These monitoring systems conventionally comprise, on the one hand, electronic units (also called wheel units) mounted on each of the wheels of the vehicle, and incorporating, aside from the aforementioned sensors, a microprocessor, an RF transmitter and, on the other hand, a central processing unit (mounted on the vehicle) for receiving the signals transmitted by the transmitters, comprising an electronic processor incorporating a radiofrequency receiver connected to an antenna.

Such monitoring systems need information relating to the location of the transmitter electronic unit, and hence to the wheel producing this signal, to be associated with each signal received by the receiver of the central processing unit, this obligation lasting over the lifetime of the vehicle, in other words needing to be applied even after wheel changes or, more simply, exchanges in the position of these wheels.

There currently exist several methods that allow the localization of the wheels on a vehicle to be determined. Thus, for example, three low-frequency radio antennas may be used for this purpose, situated close to the wheel units, in other words respectively in the handle of the driver's side door, in that of the passenger's side door and in that of the automobile trunk.

The central processing unit sends low-frequency signals successively to each of these antennas in order to excite them. According to this procedure, the electronic unit mounted on the wheel situated close to the excited antenna transmits in response a signal comprising an identification code for said unit to the central processing unit, in such a manner that the successive excitation of the three antennas results in the localization of the three electronic units mounted on the wheels neighboring these antennas, and by deduction, in the localization of the fourth unit.

However, this localization system is relatively costly and complex since it requires 3 LF antennas. Moreover, the RF signals can sometimes be noisy, rendering the localization difficult.

Another localization system, described in FR 2 847 667, consists in equipping each wheel unit with two accelerometers whose components in the vertical plane of the acceleration measurement directions are offset by a given phase-shift angle $\alpha$. By determining the sign of this phase-shift angle $\alpha$, positive or negative, the phase-shift direction between the two accelerometers, in other words the direction of rotation of the wheel, may be determined. Using the direction of travel of the vehicle, which is known to the central processing unit, the lateral position of the wheels can thus be determined. The determination of the longitudinal position can then be carried out based on the strength of the RF signal received by the central processing unit. Indeed, if the latter is unbalanced with respect to the front axle and to the rear axle of the vehicle, for example if it is situated nearer to the front axle than to the rear axle, then the signals sent by the wheel units of the front wheels will be of higher intensity than those sent by the wheel units of the rear wheels, thus allowing the longitudinal localization of the wheel units.

This method for localization of the wheels using accelerometers has the advantage of being fast and robust.

However, a sufficient number of acceleration measurements need to be carried out during one rotation of a wheel in order to be able to determine the sign of the phase-shift angle $\alpha$. This is because, depending on the position of the two accelerometers around the circumference of the wheel, the determination of the sign of the phase-shift angle $\alpha$ may be subject to interference for example from obstacles on the road, or due to spurious and unexpected accelerations or decelerations such as in the case of skidding of the wheels or of operation of the anti-skid system. In order to quickly determine a reliable value of the sign of the phase-shift angle $\alpha$, these acceleration measurements provided by the two accelerometers must therefore be repeated several times per wheel rotation, then averaged or added in order to determine the direction of rotation of the wheel.

However, if the acceleration measurements and the calculation of the sign of the phase-shift angle between the two accelerometers are carried out in a continuous manner, or at a high frequency, for example every 2 ms, the lifetime of the battery powering the unit (and hence the accelerometers and the microprocessor integrated into the unit and performing the calculation) is greatly reduced.

On the other hand, if a reasonably long interval of time is set between two acceleration measurements, long enough not to load the battery unnecessarily, then this interval of time may prove to be sufficient to carry out a minimum number of acceleration measurements per wheel rotation at low rotation speeds or for wheels whose rim radius is large, but it could turn out to be too long for high rotation speeds or for smaller rim radii. Indeed, if this interval is too long, then the number of acceleration measurements per wheel rotation is insufficient to be able to determine quickly (in other words in a small number of wheel rotations) and reliably the sign of the phase-shift angle.

Fixing a predetermined interval of time between two successive acceleration measurements provided by the two accelerometers is not therefore desirable. This varies with the speed of rotation of the wheel, and consequently with the speed of the vehicle, and also with the radius of the rim of the wheel. Indeed, the smaller the radius, the shorter the time needed to make one wheel rotation, and hence the closer together the measurements must be.

The aim of the present invention is to overcome this drawback by calculating an interval of time between two successive acceleration measurements that is adapted to the speed of rotation of the wheel, in order to determine reliably and quickly the sign of the phase-shift angle.

The present invention provides a method for localization of the lateral position of the wheels of a vehicle, said vehicle being equipped with a tire pressure monitoring system, and being equipped with an electronic central processing unit, said wheels each comprising:

an electronic unit fixed onto a rim of radius R and comprising two accelerometers disposed perpendicular to one another and measuring the acceleration of the wheel in such a manner that one accelerometer measures a radial component $F_1$ of the acceleration, and that the other accelerometer measures a tangential component of the acceleration; the acceleration measurements from the two accelerometers being out of phase by a predetermined phase-shift angle, a microprocessor, said method comprising the following steps:

I) measurement, per wheel rotation, at given intervals of time Tmeasurement, of a number N of acceleration values by each of the accelerometers, II) calculation by the microprocessor of a physical value representative of the sign of the phase-shift angle between the two accelerometers, III) determination by the central processing unit of the vehicle of the lateral position of the wheel using the physical value representative of the sign of the phase-shift angle, the method being noteworthy in that during the step I):

a minimum number N of acceleration measurements is set per wheel rotation needed for the calculation of the sign of the phase-shift angle, and the intervals of time Tmeasurement between two acceleration measurements are determined by the following equation:

$$T_{measurement} = \frac{2\pi \cdot \sqrt{\frac{R}{F_1}}}{N}$$

The invention advantageously includes, in a first embodiment, the setting of the number of acceleration measurements per wheel rotation at 4 (N=4) for a given rim radius.

The invention therefore allows the interval of time between two acceleration measurements to be directly calculated taking into account the rim radius of the wheel, together with the centrifugal acceleration of the wheel, measured by the radial accelerometer.

In addition, by performing only 4 acceleration measurements per wheel rotation, for any rotation speed and any given rim radius, the invention allows the sign of the phase-shift angle between the two accelerometers, in other words the direction of rotation of the wheel, to be quickly determined. This thus limits the energy consumption from the battery powering the electronic unit.

In a second embodiment, the radius of the rim is estimated and a number of acceleration measurements per wheel rotation greater than 4 is used.

In a third embodiment, for a set of wheels equipped with rims of various radii, the number of acceleration measurements per wheel rotation, for each of these wheels, is fixed at 5, and the rim radius used for determining the interval of time is chosen in such a manner that it represents the average value of the set of rim radii being considered.

In addition, the invention includes, for any one of the preceding embodiments, the repetition of the steps I to III a predetermined number of times after the vehicle is started, until a point where the physical value reaches a threshold representative of the sign of the phase-shift angle.

Advantageously, the acceleration measurements are filtered, for example by a high-pass and/or low-pass filter, in order to eliminate the signals coming from spurious noise sources.

The invention furthermore includes the possibility of halting the localization method at the step II, if the calculated physical value is greater than a reference physical value.

This reference physical value can advantageously correspond to the physical value obtained during a maximum acceleration of the vehicle.

The invention also relates to any device for lateral localization of the position of the wheels of a vehicle implementing the method described hereinabove. The invention is equally applicable to any automobile vehicle comprising this device.

BRIEF DESCRIPTION OF THE DRAWINGS

Other aims, features and advantages of the invention will become apparent upon reading the description that follows by way of non-limiting example and with reference to the appended drawings in which.

DETAILED DESCRIPTION OF THE INVENTION

Figure 1:
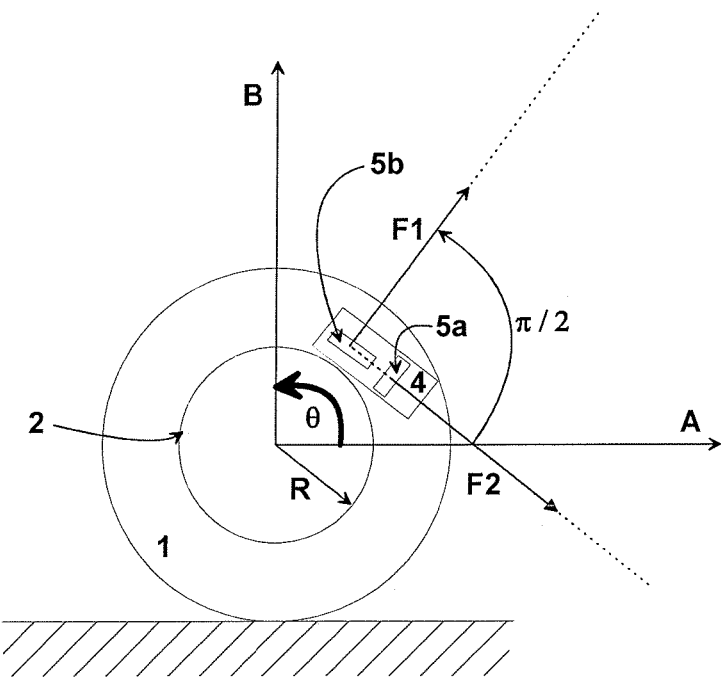
FIG. 1 is a schematic diagram of the device for lateral localization of the wheels of a vehicle according to the invention.

The device for lateral localization of the wheels of a vehicle according to the invention is illustrated in FIG. 1. A vehicle (not shown) is equipped with a wheel 1 mounted on a rim 2 of radius R. This wheel 1 is equipped with a wheel unit 4, fixed onto its rim 2. Two accelerometers 5a and 5b are disposed within the wheel unit 4. They are perpendicular to one another in such a manner that the first accelerometer 5a is disposed tangentially to the wheel and measures the tangential component of the acceleration (this accelerometer will be referred to as a tangential accelerometer 5a), and that the second accelerometer 5b is disposed radially with respect to the wheel and measures the radial component of the acceleration (this accelerometer will be referred to as a radial accelerometer 5b). Their respective measurements of the acceleration of the wheel, represented by the arrows $F_1$ and $F_2$, are therefore offset by a phase-shift angle of value $\pi/2$.

Figure 2:
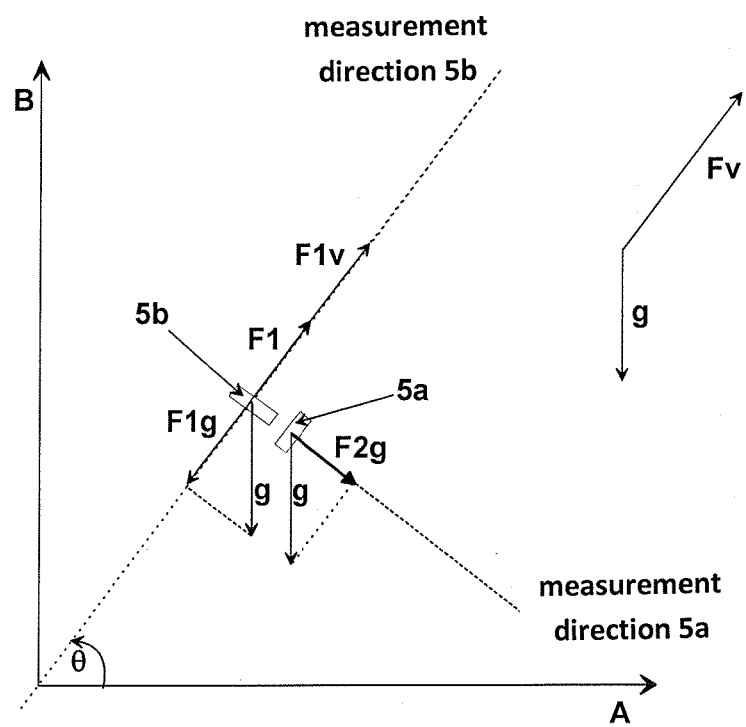
FIG. 2 illustrates the decomposition of the acceleration force undergone by each accelerometer according to their respective direction of measurement.

As illustrated in FIG. 2, the acceleration force $\vec{F}_1$ measured by the radial accelerometer 5b is the resultant of two radial components: a force $\vec{F}_{1g}$, which is the projection of the gravitational force g along the direction of measurement of the accelerometer 5b, and a force $\vec{F}_{1v}$ which is the projection of the centrifugal force $\vec{F}_v$ along the direction of measurement of the accelerometer 5b, Thus:

$$\vec{F}_1 = \vec{F}_{1g} + \vec{F}_{1v}$$

It should be noted that the projection of the centrifugal force along the direction of measurement of the accelerometer 5b is equal to the centrifugal force, since this direction of measurement is directed radially with respect to the wheel, and that the centrifugal force is exerted radially to the wheel. Consequently: $\vec{F}_{1v} = \vec{F}_v$.

The value of the projection of the gravitational force along the direction of measurement of the radial accelerometer 5b, at time t, is expressed in the following manner:

$$F_{1g}(t) = g \cdot \sin(w(t) \cdot t) \qquad (1)$$

where:

g: represents the gravitational constant, which is a vertical vector directed downwards, with a value of −9.81 m/s² w(t): is the angular speed of rotation of the radial accelerometer 5b at time t.

t: is the unit of time in seconds.

The value of the centrifugal force is expressed in the following manner:

$$F_v(t) = R \cdot w(t)^2 \quad (2)$$

with R: the distance between the accelerometer and the axis of rotation of the wheel, in other words the radius of the rim.

Consequently:

$$F_1(t) = g \cdot \sin(w(t) \cdot t) + R \cdot w(t)^2 \quad (3)$$

and:

$$w(t) = \frac{v(t)}{R}$$

with v(t) the linear speed of the vehicle.

The force $\vec{F}_2$ of acceleration measured by the tangential accelerometer 5a only has one component, a force $\vec{F}_{2g}$ which is the projection of the gravitational force along the direction of measurement of the tangential accelerometer 5a (cf. FIG. 2). This is because the tangential accelerometer 5a measures the projection of the acceleration along its direction of measurement which is tangential, and given that the centrifugal acceleration is exerted radially to the wheel, its projection along the tangential direction of measurement of the tangential accelerometer 5b is zero. Consequently, the radial component of the centrifugal acceleration $\vec{F}_{2v}$ is zero, thus:

$$F_2(t) = g \cos(w(t) \cdot t) \quad (4)$$

The expression $g \cdot \sin(w(t) \cdot t)$ in the formula (3) varies from +9.81 to −9.81 because $\sin(w(t) \cdot t)$ varies from −1 to +1, so the value of this expression is negligible compared with the value of the centrifugal force which is proportional to the square of the linear speed of the vehicle. The expression (3) may therefore be simplified, giving:

$$F_1(t) = R \cdot w(t)^2 \quad (5)$$

During one rotation of a wheel, the angular speed is calculated as:

$$w = \frac{2 \cdot \Pi}{T} \quad (6)$$

T being equal to the time for one rotation of a wheel.

The expression (6) then becomes:

$$\frac{2 \cdot \Pi}{T} = \sqrt{\frac{F_1}{R}}$$

with $F_1$ the value of the acceleration measured by the radial accelerometer 5b over one rotation of a wheel.

The time T needed to perform one rotation of a wheel becomes:

$$T = 2 \cdot \Pi \cdot \sqrt{\frac{R}{F_1}}$$

Thus, the duration T of one rotation of a wheel is given as a function of the value of acceleration $F_1$ for one rotation of a wheel measured by the radial accelerometer 5b, and of the radius of the rim R.

If it is desired to carry out N acceleration measurements per wheel rotation, the interval of time $T_{measurement}$ between two measurements will therefore be equivalent to:

$$T_{measurement} = \frac{2 \cdot \Pi \cdot \sqrt{\frac{R}{F_1}}}{N} \quad (7)$$

In order to optimize the number of acceleration measurements N per wheel rotation carried out by the two accelerometers, the present invention includes measurement of these values at predetermined times where the variation between two successive times of the acceleration measurements is maximum.

In other words, instead of multiplying the number of samples of acceleration measurements from the two accelerometers over one rotation of a wheel, in order to obtain the sign of the phase-shift angle between the two accelerometers in a reliable manner, the idea of the invention is to only take a few measurements, but at strategic positions over one rotation of a wheel where the expression for the sign of the phase-shift angle between the two accelerometers is the most pronounced. Thus, the method for localization of the wheels according to the invention allows the lateral position of the wheels to be determined as quickly as possible.

In order to determine these optimum positions, the idea of the invention is to consider three successive pairs of measurements carried out by the two accelerometers at three different times, in other words at times i=1, i=2, and i=3. (cf. FIG. 3).

Figure 3:
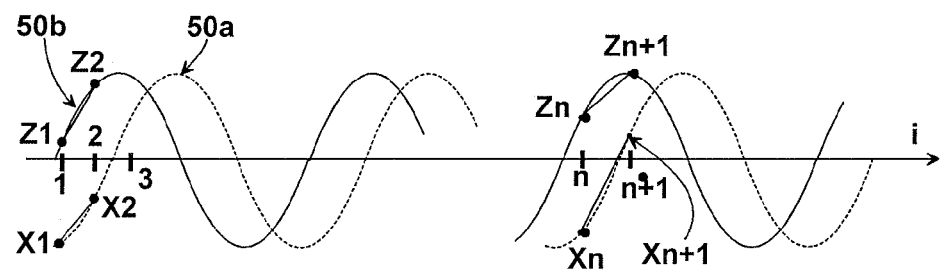
FIG. 3 illustrates the acceleration signals supplied by each accelerometer at various times.

The acceleration signals delivered by the two accelerometers 5a and 5b at various times (i=1, i=2, i=n and i=n+1) are shown in FIG. 3. The curve 50a represents the acceleration signal supplied by the tangential accelerometer 5a. The curve 50b represents the acceleration signal supplied by the radial accelerometer 5b. To facilitate the display of the signals, the component due to the centrifugal force, to which the radial accelerometer 5b is subjected, is not shown on the graph 50b. Four pairs of measurements are shown in this FIG. 3: at time i=1, the accelerometers measure the acceleration values $X_1$ and $Z_1$ (for the accelerometers 5a and 5b, respectively), at time i=2, they measure $X_2$ and $Z_2$, at time n, $X_n$, $Z_n$, and at time n+1, $X_{n+1}$ and $Z_{n+1}$.

Figure 4:
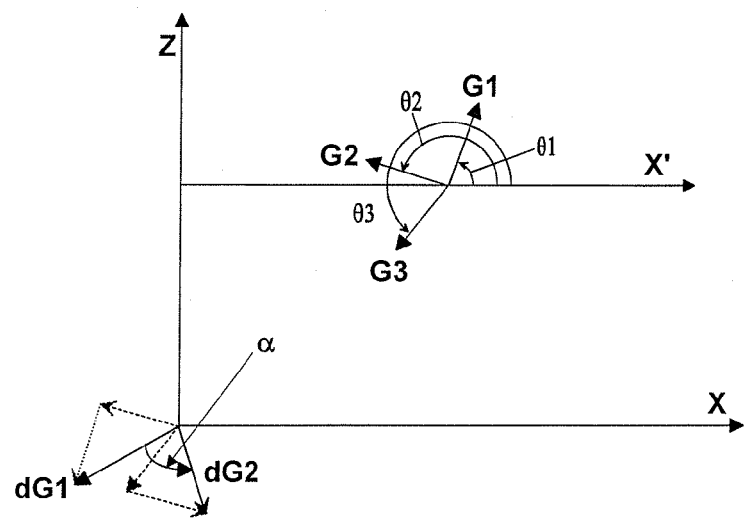
FIG. 4 illustrates the variation of the force due to gravity in the orthogonal reference frame formed by the two accelerometers, according to the invention.

If the variation of the gravitational force with time is considered in the orthogonal reference frame formed by the two accelerometers 5a and 5b, with axes X and Z (cf. FIG. 4), the components of the gravity vector at various times i with i=1, 2 and 3 in the reference frame (X, Z), are in fact the values $(X_1, Z_1)$, $(X_2, Z_2)$ and $(X_3, Z_3)$ measured by the two accelerometers at these same times.

Thus, the coordinates of the gravity vectors at these times are for i=1: $\vec{G}_1(X_1, Z_1)$, for i=2: $\vec{G}_2(X_2, Z_2)$ and for i=3: $\vec{G}_3(X_3, Z_3)$ and they form angles $\theta_1, \theta_2, \theta_3$, respectively, with an axis X' parallel to the abscissa axis X (cf. FIG. 4).

As explained beforehand, $X_i$ and $Z_i$ are the acceleration measurements from the accelerometers 5a and 5b at various times i.

Consequently, at time i=1:

$$X1(t)=F_1(t)=g \cdot \sin(\theta_1)+R \cdot w(t)^2 \quad (3)$$

and $$Z1(t)=F_2(t)=g \cdot \cos(\theta_1)) \quad (4)$$

By considering the variation in the position of the gravity vector between the times i=1 and i=2, in other words between the vectors $\vec{G}_1$ and $\vec{G}_2$, the following vector $d\vec{G}_1$ is obtained:

$$\vec{d}G_1 = \vec{G}_2 - \vec{G}_1 = \begin{bmatrix} X_2 - X_1 \\ Z_2 - Z_1 \end{bmatrix} = g \begin{bmatrix} \sin(\theta_2) - \sin(\theta_1) \\ \cos(\theta_2) - \cos(\theta_1) \end{bmatrix}$$

In the same way, between the times i=2 and i=3, the variation in the position of the gravity vector, from $\vec{G}_2$ to $\vec{G}_3$, may be expressed by the vector $\vec{d}G_2$:

$$\vec{d}G_2 = \vec{G}_3 - \vec{G}_2 = \begin{bmatrix} X_3 - X_2 \\ Z_3 - Z_2 \end{bmatrix} = g \begin{bmatrix} \sin(\theta_3) - \sin(\theta_2) \\ \cos(\theta_3) - \cos(\theta_2) \end{bmatrix}$$

By applying the vector product to the two successive variations of the position of the gravity vector in the reference frame (X, Z), the following is obtained:

$$P_1 = d\vec{G}_1 \wedge d\vec{G}_2$$
$$= dG_1 \cdot dG_2 \cdot \sin(\text{angle}(d\vec{G}_1, d\vec{G}_2))$$
$$= \begin{bmatrix} X_2 - X_1 \\ Z_2 - Z_1 \end{bmatrix} \cdot \begin{bmatrix} X_3 - X_2 \\ Z_3 - Z_2 \end{bmatrix}$$

This product is equal to:

$$P_1=dG_1 \cdot dG_2 \cdot \sin(\text{angle}(d\vec{G}_1,d\vec{G}_2))=(X_2-X_1) \cdot (Z_3-Z_2)-(Z_2-Z_1) \cdot (X_3-X_2) \quad (8)$$

with $\sin(\text{angle}(\vec{d}G_1, \vec{d}G_2))$, the sine of the angle formed between the vectors $d\vec{G}_1$ and $\vec{d}G_2$. This angle will be called α.

The product $dG_1 \cdot dG_2$ is positive since it is the product of the norms of the vectors $dG_1$ and $dG_2$. In contrast, the sign of the product: $(X_2-X_1) \cdot (Z_3-Z_2)-(Z_2-Z_1) \cdot (X_3-X_2)$ depends on the variation of the coordinates of the gravity vector between the times i=1, 2 and 3 in the reference frame (X, Z). It can be positive or negative. The sign of this product is therefore that of $\sin(\text{angle}(\alpha))$ and it provides information on the direction of rotation of the vector $d\vec{G}_1$ toward $\vec{d}G_2$, in other words on the direction of rotation of the gravity vector with respect to the reference frame (X, Z) between the times i=1 and i=3. Consequently, the sign of the expression $(X_2-X_1) \cdot (Z_3-Z_2)-(Z_2-Z_1) \cdot (X_3-X_2)$ allows the direction of the rotation of the wheel between these times to be determined.

Ideally, as the formula (8) demonstrates, three pairs of acceleration measurements at successive times are therefore sufficient for determining the direction of rotation of the wheel. However, under real conditions of use, these 3 acceleration measurements prove to be insufficient. This is because numerous spurious noise sources (state of the road, driving conditions, impacts, etc.), together with the acceleration profile of the wheel which may be discontinuous, negative or positive for brief moments (for example due to the skidding of the wheel), interfere with these measurements. Consequently, the physical value P obtained, representative of the direction of rotation, is only reliable and robust if several physical values P are generated at several times i distributed over one rotation of a wheel, and this repeats a given number of times k after the vehicle is started. According to the invention, these physical values are added together until a threshold S is reached (positive or negative depending on the direction of rotation of the wheel) that determines the sign of the phase-shift angle formed by the two accelerometers. Thus:

$$S = \sum_{i=1}^{i=k-1} P_i \quad (9)$$

In order to determine as quickly as possible the direction of rotation and to avoid multiplying the samples, the contribution of the physical value $P_i$ in the sum S must be as high as possible in order to reach the threshold S as quickly as possible. To this end, the value of $\sin(\text{angle}(\alpha))$ must be as large as possible and non-zero, in other words either +1, or −1. This is equivalent to the angle between the vectors $d\vec{G}_1$ and $d\vec{G}_2$, in other words between the vectors $\vec{G}_1$ and $\vec{G}_2$, and between the vectors $\vec{G}_2$ and $\vec{G}_3$, being a multiple of π/2. Consequently, the pairs of acceleration measurements performed by the accelerometers must be spaced out by a quarter of a wheel rotation, which is equivalent to a number of acceleration measurements per wheel rotation N equal to 4. Consequently, the formula (7), which allows the interval of time between two acceleration measurements to be determined, becomes:

$$T_{measurement} = \frac{\Pi \cdot \sqrt{\frac{R}{F_1}}}{2} \quad (10)$$

In the case where the radius of the rim R is known, the calculation of the interval of time between two acceleration measurements is therefore immediate.

On the other hand, if the radius of the rim R is unknown, according to the invention, the number of acceleration measurements N is set to be greater than 4, for example equal to 5, and the value of the rim radius R is estimated at a value representative of a possible rim radius for the vehicle in question. The purpose of this is to have a sufficient number of measurements for determining the direction of rotation of the wheel, whatever the real value of the rim radius R of the wheel mounted on the vehicle.

In the case where the interval of time between two measurements is to be determined for a set of wheels with different rim radii R, the interval of time between two measurements may be determined by applying the formula (10) with one value of the rim radius R, equivalent to the average of the rim radii in question. Thus, the interval of time between two measurements $T_{measurement}$ will be sufficient for the wheels whose rim radii R are greater than the average radius. However, for the rim radii smaller than the average radius, it must be verified that the interval of time thus calculated is sufficient for performing at least 4 measurements per wheel rotation for the smallest rim radius.

In order to avoid physical values P not representative of the real direction of rotation of the wheel, the acceleration values measured by the two accelerometers 5a and 5b are filtered, for example by a high-pass and/or low-pass filter, in order not to consider the acceleration measurements that might be noisy measurements (skidding of the wheel or engagement of the anti-skidding system, etc.). Indeed, these phenomena may considerably affect the acceleration measurements and reverse, for a brief moment, the direction of rotation of the wheel.

Thus, in order to eliminate outlier values, if the calculated physical value P is above a physical value threshold $P_{ref}$ representative of the maximum acceleration of the vehicle between the times i=1 and i=3, then this physical value P is ignored, and the localization method is halted until the next physical value P below the physical value threshold $P_{ref}$.

The method therefore consists in localizing the lateral position of the wheels of a vehicle equipped with a tire pressure monitoring system. The vehicle is equipped with an electronic central processing unit. The wheels each comprise:

an electronic unit fixed onto a rim of radius R and comprising two accelerometers 5a, 5b disposed perpendicular to one another and measuring the acceleration of the wheel in such a manner that one accelerometer 5a measures a radial component $F_1$ of the acceleration, and that the other accelerometer 5b measures a tangential component $F_2$ of the acceleration; the acceleration measurements from the two accelerometers being out of phase by a predetermined phase-shift angle α, a microprocessor, said method comprising the following steps:

I) measurement, per wheel rotation, at given intervals of time (Tmeasurement), of a number N of acceleration values by each of the accelerometers 5a, 5b, II) calculation by the microprocessor of a physical value P representative of the sign of the phase-shift angle between the two accelerometers, III) determination by the central processing unit of the vehicle of the lateral position of the wheel using the physical value P representative of the sign of the phase-shift angle, the method being noteworthy in that during the step I):

a minimum number N of acceleration measurements is set per wheel rotation needed for the calculation of the sign of the phase-shift angle, and the intervals of time (Tmeasurement) between two acceleration measurements are determined by the following equation:

$$T_{measurement} = \frac{2\pi \cdot \sqrt{\frac{R}{F_1}}}{N}$$

The invention therefore allows the direction of rotation of the wheel to be quickly determined as a function of the desired number N of acceleration measurements. This thus allows the energy of the battery for the wheel unit to be saved. In addition, the method identifies the conditions where the acceleration measurements are not representative of possible accelerations of the vehicle (elimination of the outlier values) and, in this case, the method does not determine the lateral position of the wheels.

It goes without saying that the invention is not limited to the embodiment described and depicted which is only presented by way of example.

It is for example possible to use two accelerometers perpendicular to one another, but not being in radial or tangential positions. In that case, the two accelerometers are subjected to the centrifugal force and the equation (4) is modified so as to take account of the non-zero component of the centrifugal force $\vec{F}_2$, in the expression for the acceleration measurement $\vec{F}_2$. It should however be noted that, in any case, F1v and F2v cancel each other when the variations in the gravity vectors are used and not the gravity vectors themselves.

The invention claimed is:

1. A method for localization of the lateral position of the wheels of a vehicle, said vehicle being equipped with a tire pressure monitoring system, and being equipped with an electronic central processing unit, said wheels each comprising:

an electronic unit fixed onto a rim of radius R and comprising two accelerometers (5a, 5b) disposed perpendicular to one another and measuring the acceleration of the wheel in such a manner that one accelerometer (5a) measures a radial component $F_1$ of the acceleration, and that the other accelerometer (5b) measures a tangential component $F_2$ of the acceleration; the acceleration measurements from the two accelerometers being out of phase by a predetermined phase-shift angle α, a microprocessor, said method comprising the following steps:

I) measurement, per wheel rotation, at given intervals of time (Tmeasurement), of a number (N) of acceleration values by each of the accelerometers (5a, 5b), II) calculation by the microprocessor of a physical value (P) representative of the sign of the phase-shift angle between the two accelerometers, III) determination by the central processing unit of the vehicle of the lateral position of the wheel using the physical value (P) representative of the sign of the phase-shift angle, the method being characterized in that during the step I:

a minimum number (N) of acceleration measurements is set per wheel rotation needed for the calculation of the sign of the phase-shift angle, and the intervals of time (Tmeasurement) between two acceleration measurements are determined by the following equation:

$$T_{measurement} = \frac{2\pi \cdot \sqrt{\frac{R}{F_1}}}{N}.$$

2. The localization method as claimed in claim 1, characterized in that for a given rim radius (R), the number of acceleration measurements per wheel rotation (N) is fixed at 4.

3. The localization method as claimed in claim 1, characterized in that, for an estimated rim radius (R), the number of acceleration measurements per wheel rotation (N) is greater than 4.

4. The localization method as claimed in claim 1, characterized in that, for a set of wheels equipped with rims of various radii (R), the number of acceleration measurements per wheel rotation, for each of these wheels, is fixed at 5, and the rim radius (R) used for determining the interval of time (T) is chosen in such a manner that it represents the average value of the set of rim radii (R) being considered.

5. The localization method as claimed in claim 1 characterized in that the steps I to III are repeated a predetermined number of times (k) after the vehicle is started, until the physical value (P) reaches a threshold (S) representative of the sign of the phase-shift angle.

6. The localization method as claimed in claim 1 characterized in that the acceleration measurements are filtered, by a high-pass filter and/or by a low-pass filter in order to eliminate the measurements coming from spurious noise sources.

7. The method as claimed in claim 1 characterized in that if the calculated physical value (P) is greater than a reference physical value ($P_{ref}$) then the localization method is halted at the step II.

8. The localization method as claimed in claim 7, characterized in that the reference physical value ($P_{ref}$) is determined during a maximum acceleration of the vehicle.

9. Device for lateral localization of the position of the wheels of a vehicle, said vehicle being equipped with a tire pressure monitoring system and being equipped with an electronic central processing unit, said wheels each comprising:
    an electronic unit fixed onto a rim of radius R and comprising two accelerometers (5a, 5b) disposed perpendicular to one another and measuring the acceleration of the wheel in such a manner that one accelerometer (5a) measures a radial component $F_1$ of the acceleration, and that the other accelerometer (5b) measures a tangential component $F_2$ of the acceleration; the acceleration measurements from the two accelerometers being out of phase by a predetermined phase-shift angle α,
    a microprocessor,
said device furthermore comprising:
    accelerometers (5a, 5b) designed for measuring, per wheel rotation, at given intervals of time (Tmeasurement), a number (N) of acceleration values
    a microprocessor designed to calculate a physical value (P) representative of the sign of the phase-shift angle between the two accelerometers,
    a central processing unit designed for determining the lateral position of the wheel using the physical value (P) representative of the sign of the phase-shift angle,
said device being characterized in that it furthermore comprises:
    means for fixing a minimum number (N) of acceleration measurements per wheel rotation needed for the calculation of the sign of the phase-shift angle, and
    means for determining intervals of time (Tmeasurement) between two acceleration measurements by the following equation:

$$T_{measurement} = \frac{2\pi \cdot \sqrt{\frac{R}{F_1}}}{N}.$$

* * * * *